United States Patent
Ilcisin et al.

(10) Patent No.: US 6,674,419 B2
(45) Date of Patent: Jan. 6, 2004

(54) AC PALC DISPLAY DEVICE WITH FLOATING ELECTRODE

(75) Inventors: Kevin J. Ilcisin, Beaverton, OR (US); Thomas S. Buzak, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 272 days.

(21) Appl. No.: 10/015,796

(22) Filed: Nov. 1, 2001

(65) Prior Publication Data

US 2002/0050790 A1 May 2, 2002

Related U.S. Application Data

(60) Provisional application No. 60/245,643, filed on Nov. 2, 2000.

(51) Int. Cl.$^7$ .................................................. G09G 3/28
(52) U.S. Cl. ...................... 345/66; 313/581; 315/169.4; 345/67; 345/60
(58) Field of Search ............................ 345/41, 42, 60, 345/62, 66, 67, 204–206; 315/169.1, 169.4; 313/581–587

(56) References Cited

U.S. PATENT DOCUMENTS

| | | | | |
|---|---|---|---|---|
| 4,924,148 A | * | 5/1990 | Schwartz | 315/169.4 |
| 5,077,553 A | * | 12/1991 | Buzak | 340/794 |
| 5,657,035 A | * | 8/1997 | Miyazaki | 345/60 |
| 5,838,398 A | * | 11/1998 | Ilcisin et al. | 349/32 |
| 5,907,311 A | * | 5/1999 | Yano | 345/4 |
| 5,959,397 A | * | 9/1999 | Lambert et al. | 313/422 |
| 6,052,102 A | * | 4/2000 | Abe | 345/87 |
| 6,130,655 A | * | 10/2000 | Lammers | 345/72 |
| 6,404,412 B1 | * | 6/2002 | Van Asma | 345/72 |

* cited by examiner

Primary Examiner—Kent Chang
Assistant Examiner—Tom Sheng
(74) Attorney, Agent, or Firm—John D. Winkleman; John Smith-Hill

(57) ABSTRACT

A plasma addressed display or storage device includes a substrate and at least first and second plasma electrodes on an upper surface of the substrate. The first plasma electrode is connected to an external potential and the second plasma electrode is not ohmically connected to an external potential.

8 Claims, 2 Drawing Sheets

AC PALC DISPLAY DEVICE WITH FLOATING ELECTRODE

CROSS-REFERENCE TO RELATED APPLICATION

This application claims the benefit of U.S. Provisional Application No. 60/245,643 filed Nov. 2, 2000.

BACKGROUND OF THE INVENTION

This invention relates to a plasma addressed display or storage device.

U.S. Pat. No. 5,077,553 discloses apparatus for addressing data storage elements. A practical implementation of the apparatus shown in U.S. Pat. No. 5,077,553 is illustrated schematically in FIG. 1 of the accompanying drawings.

The display panel shown in FIG. 1 comprises, in sequence from below, a polarizer 2, a lower substrate 4, ribs 6, a cover sheet 8 (commonly known as a microsheet), a layer 10 of electro-optic material, an array of parallel transparent data drive electrodes (only one of which, designated 12, can be seen in the view shown in FIG. 1), an upper substrate 14 carrying the data drive electrodes, and an upper polarizer 16. In the case of a color display panel, the panel includes color filters (not shown) between the layer 10 and the upper substrate 14. The panel may also include layers for improving viewing angle and for other purposes. The ribs 6, which are formed from insulating material, define multiple parallel channels 20 between the lower substrate and the cover sheet. The channels 20 are filled with an ionizable gas, such as helium. Two plasma electrodes (an anode 24 and a cathode 26) are provided in each of the channels 20. The channels 20 are orthogonal to the data drive electrodes and the region where a data drive electrode crosses a channel (when viewed perpendicularly to the panel) forms a discrete panel element 28. Each panel element can be considered to include elements of the layer 10 and the lower and upper polarizers 2 and 16. The region of the upper surface of the display panel that bounds the panel element constitutes a single pixel 30 of the display panel.

When the anode 24 in one of the channels is connected to a reference potential and a suitably more negative voltage is applied to the cathode 26 in that channel, the gas in the channel forms a plasma which provides a conductive path to the reference potential at the lower surface of the cover sheet 6. If a data drive electrode is at the reference potential, there is no significant electric field in the volume element of electro-optic material in the panel element at the crossing of the channel and the data drive electrode and the panel element is considered to be off, whereas if the data drive electrode is at a substantially different potential from the reference potential, there is a substantial electric field in that volume element of electro-optic material and the panel element is considered to be on.

It will be assumed in the following description, without intending to limit the scope of the claims, that the lower polarizer 2 is a linear polarizer and that its plane of polarization can be arbitrarily designated as being at 0° relative to a reference plane, that the upper polarizer 16 is a linear polarizer having its plane of polarization at 90°, and that the electro-optic material rotates the plane of polarization of linearly polarized light passing therethrough by an angle which is a function of the electric field in the electro-optic material. When the panel element is off, the angle of rotation is 90°; and when the panel element is on, the angle of rotation is zero.

The panel is illuminated from the underside by an extended light source 34 which emits unpolarized white light. A rear glass diffuser 18 having a scattering surface may be positioned between the light source and the panel in order to provide uniform illumination of the panel. The light that enters a given panel element from the source is linearly polarized at 0° by the lower polarizer 2 and passes sequentially through the channel member 4, the channel 20, the cover sheet 6, and the volume element of the electro-optic material toward the upper polarizer 16 and a viewer 32. If the panel element is off, the plane of polarization of linearly polarized light passing through the volume element of electro-optic material is rotated through 90°, and therefore the plane of polarization of light incident on the upper polarizer element is at 90°. The light is passed by the upper polarizer element and the pixel is illuminated. If, on the other hand, the panel element is on, the plane of polarization of the linearly polarized light is not changed on passing through the volume element of electro-optic material. The plane of polarization of light incident on the upper polarizer element is at 0° and therefore the light is blocked by the upper polarizer element and the pixel is dark. If the electric field in the volume element of electro-optic material is intermediate the values associated with the panel element being off and on, light is passed by the upper polarizer element with an intensity which depends on the electric field, allowing a gray scale to be displayed.

The plasma electrodes 24, 26 are connected ohmically to external reference potentials during display operation. It is assumed for the purposes of this discussion that the values of the reference potentials supplied to the plasma electrodes are not substantially affected by capacitive loading of the external electronics. If this is true then the potentials asserted on the electrodes 24, 26 are not substantially affected by capacitive coupling. If, however, one of the electrodes 24, 26 were disconnected from its respective reference potential, capacitive coupling would cause the potential on the electrode to float to a value determined by the precise extent of the capacitive coupling to any neighboring conductors.

A discharge that is initiated in an ionizable gas between two electrodes that are both exposed to the gas is known as a DC discharge. The conventional display shown in FIG. 1 employs a DC discharge. A discharge can be initiated in an ionizable gas even if at least one of the electrodes is electrically insulated from the ionizable gas. Such a discharge is known as an AC discharge. A PALC device that employs an AC discharge is referred to as an AC PALC device.

SUMMARY OF THE INVENTION

In accordance with a first aspect of the invention there is provided a plasma addressed display or storage device comprising a substrate, at least first and second plasma electrodes on an upper surface of the substrate, a layer of insulating material over the plasma electrodes, a cover sheet spaced from the layer of insulating material, ionizable gas between the cover sheet and the layer of insulating material, an array of data drive electrodes, the cover sheet being between the data drive electrodes and the layer of insulating material, a layer of electro-optic material between the data drive electrodes and the cover sheet, and a means for ohmically connecting the first plasma electrode to an external potential, and wherein the second plasma electrode is not ohmically connected to an external potential.

In accordance with a second aspect of the invention there is provided a method of initiating a discharge in a plasma addressed display or storage device that comprises a substrate, at least first and second plasma electrodes on an upper surface of the substrate, a layer of insulating material over the plasma electrodes, a cover sheet spaced from the layer of insulating material, ionizable gas between the cover sheet and the layer of insulating material, an array of data drive electrodes, the cover sheet being between the data drive electrodes and the layer of insulating material, and a layer of electro-optic material between the data drive electrodes and the cover sheet, and wherein said method comprises ohmically connecting the first plasma electrode to a first external potential, and capacitively coupling the second plasma electrode to a second external potential.

In accordance with a third aspect of the invention there is provided a plasma addressed display or storage device comprising a substrate, at least one plasma electrode on an upper surface of the substrate, a layer of insulating material over the plasma electrode, ribs over the layer of insulating material, a cover sheet placed over the ribs and spaced from the layer of insulating material by the ribs, ionizable gas between the cover sheet and the layer of insulating material, an array of data drive electrodes, the cover sheet being between the data drive electrodes and the layer of insulating material, and a layer of electro-optic material between the data drive electrodes and the cover sheet, and wherein the ribs are made from conductive material and are not ohmically connected to an external potential.

BRIEF DESCRIPTION OF THE DRAWINGS

For a better understanding of the invention, and to show how the same may be carried into effect, reference will now be made, by way of example, to the accompanying drawings, in which.

In the several figures of the drawings, like reference numerals designate like or corresponding components.

In this specification, words of orientation and position, such as upper and lower, are used to establish orientation and position relative to the drawings and are not intended to be limiting in an absolute sense. Thus, a surface that is described as upper in the specification may correspond, in a practical implementation of the invention, to a lower surface or a vertical surface, which is neither upper nor lower.

DETAILED DESCRIPTION

Figure 1:
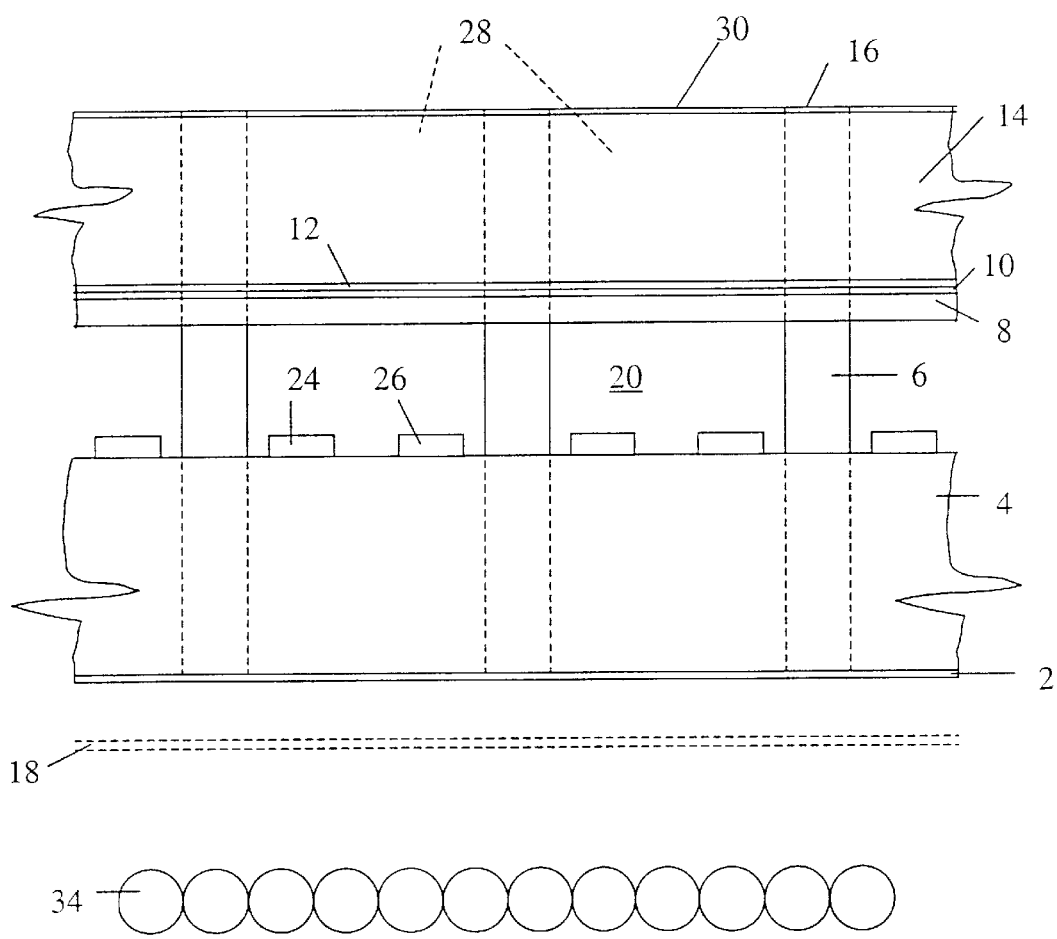
FIG. 1 is a partial sectional view of a PALC display in accordance with the prior art.
Figure 2:
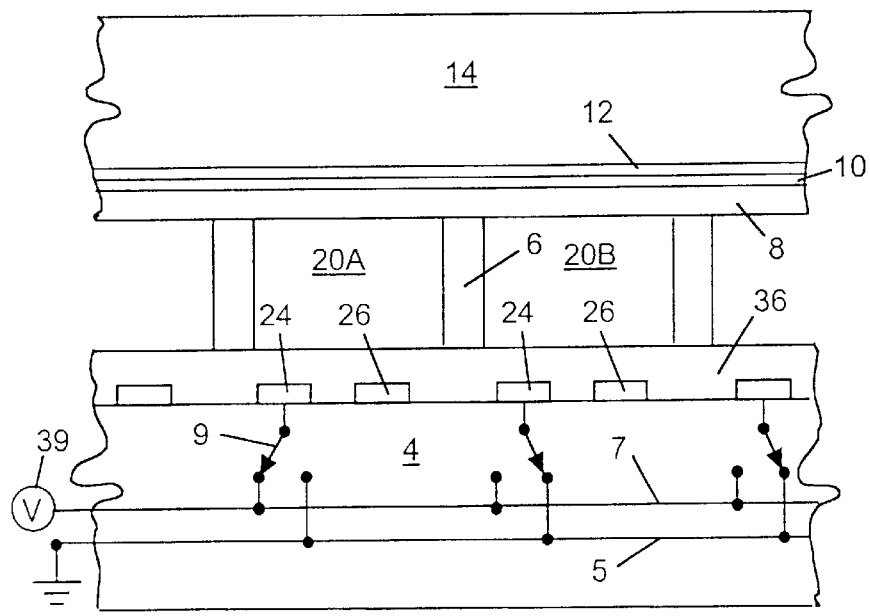
FIG. 2 is a partial sectional view of a first PALC panel in accordance with the present invention.

The PALC panel shown in FIG. 2 is an AC PALC panel and includes a blanket dielectric layer 36 of a dielectric material over the plasma electrodes 24, 26 positioned on the upper surface of the electrode substrate 4. The dielectric material may be, for example, glass frit that has been deposited by screen printing and then fused. The ribs 6 are composed of insulating material and are formed over the layer 36 by thick film screen printing. The cover sheet 8 is attached over, and is spaced from the dielectric layer 36 by, the ribs 6.

The plasma electrodes 24 are connected to respective switches 9 which allow each electrode 24 to be connected ohmically either to a rail 7, which is connected to an external circuit 39, or to a rail 5 which is connected to external ground reference. The electrode 26 in each channel is not ohmically connected to an external reference potential, but is, however, coupled capacitively to all neighboring conductors, including the electrode 24 in the adjacent channel.

The ohmic connections to the plasma electrodes 24 are of low impedance. Therefore any external reference potentials applied to the plasma electrodes 24 will not be substantially altered by the high impedance capacitive coupling that exists between the electrodes 24 and the potentials residing on any neighboring conductors. By contrast, because there is no low impedance, ohmic, connection to the plasma electrodes 26, the potential on the plasma electrodes 26 will be determined by the capacitive coupling that exists between the electrodes 26 and the potentials residing on any neighboring conductors.

In operation, one of the channels 20 is active and all the other channels are inactive. In FIG. 2, the active channel is designated 20A and an adjacent inactive channel is designated 20B. The switch 9 to which the electrode 24 in the active channel 20A is connected, selects the rail 7, while the switch 9 to which electrode 24 in the inactive channel 20B is connected, selects the rail 5. The potential of the external circuit 39 is sufficient to initiate a discharge in the active channel 20A. Since the electrodes 24 in the inactive channels are grounded, no discharge is initiated in the inactive channels.

The discharge current in the active channel 20A flows from the electrode 24 in the channel 20A, is capacitively coupled through the layer 36, is conducted through the ionized gas and is then capacitively coupled through the electrode 26 in channel 20A to the electrode 24 in the adjacent inactive channel 20B. The electrode 24 in channel 20B then returns the current to external ground reference through the ohmic connection to the rail 5.

The dielectric layer 36 may be composed of a lower layer of fused glass frit and an upper layer of an electron emissive material, which is typically provided in an AC PALC display in order to reduce the potential needed to initiate the discharge. A suitable electron emissive material is magnesium oxide because it is transparent and does not impair the transmissivity of the panel.

Figure 3:
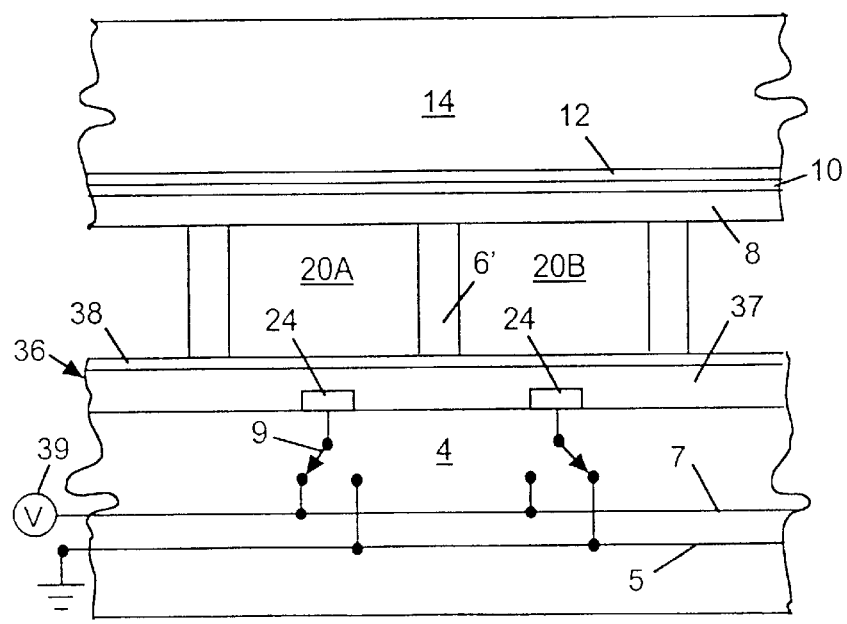
FIG. 3 is a partial sectional view of a second PALC panel in accordance with the present invention.

FIG. 3 illustrates a preferred embodiment of the present invention. In accordance with FIG. 3, the dielectric layer 36 comprises a lower layer 37 of fused glass frit and an upper layer 38 of electron emissive material. The ribs 6' that space the cover sheet 8 from the layer 36 are made of conductive material. The ribs 6', which are not ohmically connected to an external reference potential, provide the means for capacitively coupling to ground and therefore serve the same purpose as the plasma electrodes 26 in FIG. 2. The electrode substrate 4 in FIG. 3 has a single electrode 24, connected to the switch 9 for each channel 20 in the device.

The preferred embodiment shown in FIG. 3 has the advantage of allowing a greater variety of materials to be used to space the cover sheet 8 from the layer 36. For example, the ribs 6' could be fabricated from a continuous sheet of metal in which an array of parallel slots has been formed in much the same way that a cathode ray tube (CRT) tension mask is fabricated. One advantage of an extended structure such as this, wherein all the ribs are connected together ohmically, is that a stronger capacitive coupling to ground is achieved.

An additional advantage of the invention is the ability to achieve satisfactory operation of the AC discharge without need for an ohmic connection to the electrodes 26 in FIG. 2 or the conductive ribs 6' in FIG. 3, which reduces the number of electrical interconnects to the plasma electrodes. This lowers the packaging costs for the device, simplifies the processing and reduces the potential for damaging the device during the process of attaching the interconnects.

It will be appreciated that the invention is not restricted to the particular embodiments that have been described, and that variations may be made therein without departing from the scope of the invention as defined in the appended claims and equivalents thereof. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated.

What is claimed is:

1. A plasma addressed display or storage device comprising:
   a substrate,
   at least first and second plasma electrodes on an upper surface of the substrate,
   a layer of insulating material over the plasma electrodes,
   a cover sheet spaced from the layer of insulating material,
   ionizable gas between the cover sheet and the layer of insulating material,
   an array of data drive electrodes, the cover sheet being between the data drive electrodes and the layer of insulating material,
   a layer of electro-optic material between the data drive electrodes and the cover sheet, and
   a means for ohmically connecting the first plasma electrode to an external potential,
   and wherein the second plasma electrode is not ohmically connected to an external potential.

2. A plasma addressed display or storage device according to claim 1, wherein the layer of insulating material includes a layer of electron emissive material having a free surface exposed to the ionizable gas.

3. A plasma addressed display or storage device according to claim 2, wherein the electron emissive material is magnesium oxide.

4. A plasma addressed display or storage device comprising:
   a substrate,
   at least one plasma electrode on an upper surface of the substrate,
   a layer of insulating material over the plasma electrode,
   ribs over the layer of insulating material,
   a cover sheet placed over the ribs and spaced from the layer of insulating material by the ribs,
   ionizable gas between the cover sheet and the layer of insulating material,
   an array of data drive electrodes, the cover sheet being between the data drive electrodes and the layer of insulating material, and
   a layer of electro-optic material between the data drive electrodes and the cover sheet,
   and wherein the ribs are made from conductive material and are not ohmically connected to an external potential.

5. A plasma addressed display or storage device according to claim 4, wherein the layer of insulating material includes a layer of electron emissive material having a free surface exposed to the ionizable gas.

6. A plasma addressed display or storage device according to claim 5, wherein the electron emissive material is magnesium oxide.

7. A plasma addressed display or storage device according to claim 4, wherein the ribs are ohmically connected to one another.

8. A plasma addressed display or storage device according to claim 4, wherein the ribs comprise a continuous sheet of metal formed with an array of parallel slots.

* * * * *